United States Patent
Wu et al.

(10) Patent No.: US 10,038,785 B1
(45) Date of Patent: Jul. 31, 2018

(54) METHODS AND SYSTEMS FOR AUTOMATICALLY RECOGNIZING ACTIONS IN A CALL CENTER ENVIRONMENT USING VIDEO DATA

(71) Applicant: Conduent Business Services, LLC, Dallas, TX (US)

(72) Inventors: Wencheng Wu, Rochester, NY (US); Eric Michael Gross, Rochester, NY (US); Michael C. Mongeon, Walworth, NY (US); Jinhui Yao, Pittsford, NY (US); Rakesh S. Kulkarni, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/479,660

(22) Filed: Apr. 5, 2017

Related U.S. Application Data (60) Provisional application No. 62/453,589, filed on Feb. 2, 2017.

(51) Int. Cl.
| | |
|---|---|
| *H04M 3/51* | (2006.01) |
| *H04M 3/42* | (2006.01) |
| *G06K 9/00* | (2006.01) |
| *G06K 9/62* | (2006.01) |
| *G06K 9/34* | (2006.01) |
| *G10L 25/78* | (2013.01) |

(52) U.S. Cl.
CPC ...... *H04M 3/5175* (2013.01); *G06K 9/00355* (2013.01); *G06K 9/00744* (2013.01); *G06K 9/346* (2013.01); *G06K 9/6215* (2013.01); *G10L 25/78* (2013.01); *H04M 3/42221* (2013.01); *H04M 3/5183* (2013.01); *G06K 2209/03* (2013.01)

(58) Field of Classification Search
CPC ............ H04M 3/5175; H04M 3/5183; H04M 3/42221
See application file for complete search history.

(56) References Cited

U.S. PATENT DOCUMENTS

| | | | | |
|---|---|---|---|---|
| 8,463,606 | B2 * | 6/2013 | Scott | H04M 3/42221 |
| | | | | 379/88.03 |
| 2010/0205561 | A1 | 8/2010 | Chen et al. | |
| 2013/0016115 | A1 * | 1/2013 | Minert | G06Q 10/06 |
| | | | | 345/589 |

(Continued)

*Primary Examiner* — Nafiz E Hoque
(74) *Attorney, Agent, or Firm* — Fox Rothschild LLP (57) ABSTRACT

A system for recognizing processes performed by a call center agent during a session may receive input data from a screen recording system that includes a video signal representing a plurality of frames from a time-series video recording or video stream of a desktop of a user electronic device. The system processes the video signal to identify one or more frames of interest from the plurality of frames. Each frame of interest includes a change in a layout of the corresponding one or more screens as compared to a preceding frame in the time-series video recording. The system automatically identifies actions performed by the call center agent that represent an interaction that the call center agent had with one or more screens corresponding to the frame of interest. The system generates an event log that includes a timeline depicting a visual representation of the identified actions.

14 Claims, 8 Drawing Sheets

(56) References Cited

U.S. PATENT DOCUMENTS

| | | | |
|---|---|---|---|
| 2014/0095600 A1 | 4/2014 | Needham | |
| 2014/0222995 A1 | 8/2014 | Razden et al. | |
| 2015/0131792 A1* | 5/2015 | Kuhn | H04M 3/42221 379/265.03 |
| 2015/0378577 A1* | 12/2015 | Lum | G06Q 10/10 715/720 |

* cited by examiner

METHODS AND SYSTEMS FOR AUTOMATICALLY RECOGNIZING ACTIONS IN A CALL CENTER ENVIRONMENT USING VIDEO DATA

CROSS-REFERENCE TO RELATED APPLICATIONS

This application claims the benefit of U.S. Provisional Patent Application No. 62/453,589 filed Feb. 2, 2017, the content of which is herein incorporated by reference in its entirety.

BACKGROUND

In a call center environment, it is important to understand interactions that call center agents have with programs and applications that are used to handle caller inquiries such as, for example, what application or programs a call center agent uses, or more specifically, a sequences of application and program interactions, and a sequence of data field interactions that a call center agent performs during order processing, customer support, technical support, troubleshooting and/or the like. In call center environments, action discovery is typically accomplished by consultants who work alongside call center agents to understand the steps of the processes being performed, or who manually review recorded call center agent sessions offline. This requires a large time investment from the consultants, increases the time required to complete a process improvement initiative, and is a hindrance to existing process deliveries. In addition, details of the process can be missed utilizing this approach.

The methods and systems described in this disclosure overcome many of the deficiencies of known process recognition approaches by implementing an automatic computer-implemented process recognition process that operates seamlessly with call center communications systems technology behind the scenes while a call center agent is performing his or her duties. This approach provides an accurate, efficient and cost effective way to automatically recognize processes and actions being performed by a call center agent during sessions without the need for human physical observation. Once these processes and actions are understood, they can be leveraged to identify process inefficiencies and bottlenecks.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a system for recognizing processes performed by a call center agent during a session may include an electronic device and a computer-readable storage medium that includes one or more programming instructions that, when executed, cause the electronic device to perform one or more actions. The system receives input data from a screen recording system. The input data includes a video signal representing a plurality of frames from a time-series video recording or video stream of a desktop of a user electronic device. In some embodiments, the input data may include audio data corresponding to a conversation between the call center agent and a caller during the session. The user electronic device is associated with a call center agent in a call center environment, and each frame from the time-series video recording or video stream includes an image of one or more screens displayed on the desktop during a session. The system processes the video signal to identify one or more frames of interest from the plurality of frames. Each frame of interest includes a change in a layout of the corresponding one or more screens as compared to a preceding frame in the time-series video recording. The system automatically identifies within one or more of the frames of interest one or more actions performed by the call center agent. Each action represents an interaction that the call center agent had with one or more screens corresponding to the frame of interest. The system generates an event log that includes a timeline depicting a visual representation of the identified actions.

Optionally, the system may receive the input data from a video camera that is positioned to the record time-series video recording or video stream of the desktop. Alternatively, the system may receive the input data from one or more video recording sensors that support video compression methods.

The system may process a video signal to identify one or more frames of interest by identifying a first frame from the plurality of frames as a background frame, identifying a second frame from the plurality of frames, where the second frame immediately follows the first frame in the time-series video recording or video stream, performing background modeling and background subtraction on the first frame and the second frame to determine whether the second frame comprises a significant change in a layout of the screens corresponding to the second frame as compared to the first frame, and in response to determining that the second frame comprises the significant change, flagging the second frame as a frame of interest. Optionally, the system may perform screen recognition on the one or more frames of interest to identify a screen identifier for each frame of interest.

The system may automatically identify within one or more of the frames of interest one or more actions performed by the call center agent by, for one or more of the frames of interest, identifying a window change as a performed action if the screen identifier for the frame of interest differs from a screen identifier associated with a frame that immediately precedes the frame of interest or a frame that immediately follows the frame of interest. The system may perform screen recognition by identifying one or more unique screen images from a unique screen library, where each of the unique screen images is associated with a screen identifier, and for each frame of interest, comparing the frame of interest to each of the one or more unique screen images to identify a matching screen. The system may compare the frame of interest to each of the one or more unique screen images to identify a matching screen by, for each of the unique screen images, applying a first scale to the frame of interest and the unique screen image to determine a first score and applying a second scale to the frame of interest and the unique screen image to determine a second score, determining a final match score for the unique screen image by summing the first score and the second score, and selecting the unique screen image having the highest corresponding final match score. The first score is indicative of how well a high level layout of the frame of interest corresponds to a high level layout of the unique screen image, and the second score is indicative of how well a low level layout of the frame of interest corresponds to a low level layout of the unique screen image.

Optionally, the system may automatically identify within one or more of the frames of interest one or more actions performed by the call center agent by performing frame differencing on the one or more frames of interest to detect one or more regions of interest, where each region of interest represents a change in pixel level, determining whether the region of interest comprises a desktop window, and in response to determining that the region of interest comprises a desktop window, identifying a window opening as a performed action.

Alternatively, the system may automatically identify within one or more of the frames of interest one or more actions performed by the call center agent by performing frame differencing on the one or more frames of interest to detect one or more regions of interest, where each region of interest represents a change in pixel level, determining whether the region of interest comprises a movement in a position of a mouse cursor, and in response to determining that the region of interest comprises a movement in a position of a mouse cursor, identifying a mouse event as a performed action.

The system may generate an event log by identifying whether the identified actions includes a plurality of short-duration typing events at a same text-field, in response to identifying that the identified actions includes a plurality of short-duration typing events at a same text-field, combining the short-duration typing events into a single typing event, and adding the single typing event to the event log.

In certain embodiments, the input data may include audio data. The system may analyze audio data for one or more periods of dead time during which neither the call center agent nor the caller is speaking, and for one or more of the periods of dead time, analyzing the identified actions that occurred during the periods of dead time to determine one or more possible reasons for the periods of dead time.

DETAILED DESCRIPTION

The following terms shall have, for purposes of this application, the respective meanings set forth below:

A "call center" is an organization, ocation or group of location; that operates to initiate and/or receive inquiries from customers via phone, interactive messaging applications such as chat applications, or other interactive electronic media. A call center may process orders, provide customer service, provide technical support, answer inquiries initiated by telephone, email, fax, or from other input sources and/or the like. A call center utilizes various hardware, software and network components. For example, a call center may include electronic devices, such as desktop or laptop computers, that call agents may use to handle calls. Call center agents may also use headsets to hear call audio. Electronic devices in a call center may communicate with one another or other electronic devices using one or more communication networks. A communication network may be a local area network (LAN), a wide area network (WAN), a mobile or cellular communication network, an extranet, an intranet, the Internet and/or the like. Electronic devices in a call center may run or operate various programs or applications to help call center agents perform their jobs. Examples of such programs or applications include, without limitation, customer relationship management systems, enterprise resource planning systems, workforce management systems, call queuing systems, call recording systems, and/or the like. Call centers may include physical telephones via which call center agents place and receive calls. Additionally and/or alternatively, call centers may utilize voice over Internet protocol (VoIP) to place and receive calls. Examples include telemarketing centers, customer technical or product support groups, and centers for receiving customer orders aria phone.

A "call center agent" is a person who is employed to initiate and/or receive communications, such as phone calls, web chats, or other live communications, from the call center's customers. A "call" refers to any such communication between a customer and a call center agent.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "memory," "memory device," "data store," "data storage facility" and the like each refer to a nontransitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

A "session" refers to a period of time during which a call center agent is assisting a client, customer or otherwise engaging a caller.

A "widget" refers to an element of a graphical user interface window that displays information or provides a mechanism by which a user, such as a call center agent, can interact with a program or application.

A "window" or "screen" refers to a portion of a graphical user interface associated with an application, program or the like.

The present disclosure describes various systems and methods for performing process mining using image analytics in an environment, such as a call center environment. In various embodiments, network sniffers or other software monitoring systems may be used to monitor network and input data at an electronic device, and this data can be used to identify relevant processes. However, the use of such sniffers or monitoring software may not be advisable in certain environments, such as a call center, because of the frequency with which personal information is encountered in such environments. For example, a call center for a bank or credit card provider has access to customers' personal information such as social security number, bank account numbers, credit card numbers and/or the like. The use of network sniffer or monitoring software may make this personal information accessible to the person or entity performing the process mining (such as business consultants).

A process refers to a set of computer-implemented steps or actions performed by a user to accomplish a particular result. For instance, in a call center environment, a call center agent may utilize various computer programs or applications to handle, address or resolve customer inquiries. The call center agent may gather information pertaining to the inquiry from the caller, and may provide certain information to the computer programs or applications via one or more windows. A process may refer to the steps or actions performed in the agent's interaction with the computer programs or applications.

A window may include one or more static elements and or dynamic elements. A static element refers to data that is not changeable by a user of the window. Example static elements may include text such as field labels, instructions, notes and/or the like. A dynamic element refers to data whose value or content is changeable by a user of the window. Example dynamic elements may be widgets such as, for example, text fields, drop down menus, radio buttons and/or the like.

Figure 1:
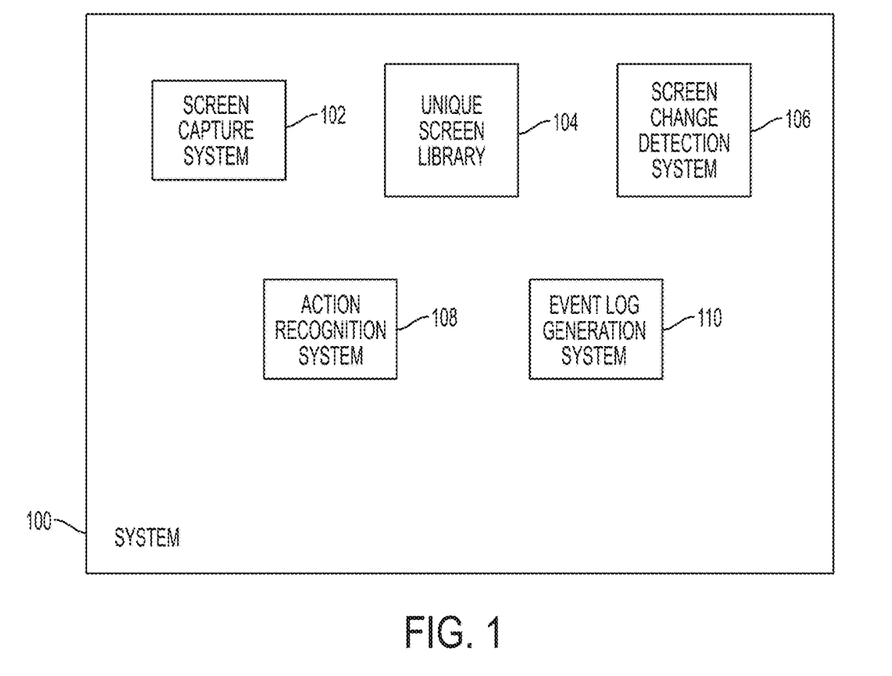
FIG. 1 shows an example system for performing process recognition according to an embodiment.

FIG. 1 illustrates an example system for performing process recognition according to an embodiment. As illustrated by FIG. 1, the system 100 includes a screen capture system 102, a unique screen library 104, a screen change detection system 106, an action recognition system 108, and an event log generation system 110. One or more components of the system 100 may reside on a user electronic device or other electronic device. Alternatively, one or more components of the system 100 may be distributed, but communicate with one or more of the other components, a user electronic device, or one or more other electronic devices involved in performing process mining.

The data collection system 102 acquires time-series images of a desktop of a user electronic device over a period of time. A user electronic device refers to an electronic device associated with a user who is performing at least a portion of one or more processes that is being discovered. For instance, a user electronic device may refer to a desktop or laptop computer used by a call center agent who provides customer or technical support. Additional and/or alternate electronic devices may be used within the scope of this disclosure.

As an example, in a call center environment, a data collection system 102 may acquire input data in the form of time-series images of a desktop of a call center agent's electronic device during the agent's interactions with customers.

A data collection system 102 may include one or more image or video capture sensors. For example, a data collection system 102 may include one or more video recording sensors such as, for example, a video media player or component that supports audio and video compression methods, file formats, streaming protocols and/or the like.

In another embodiment, a data collection system 102 may include one or more cameras, video cameras, and/or the like. The video cameras may be positioned in view of a user electronic device so as to capture input data including a video signal.

A data collection system may generate a video signal. The video signal may include one or more frames from a time-series video recording or video stream. The video recording or video stream may be of a desktop of a user electronic device during a session. For instance, a user electronic device may be associated with a call center agent in a call center environment. Each frame may include an image of one or more screens that are displayed on the desktop during a session. For instance, a video camera may be mounted to a display device, such as a monitor, of a user electronic device and angled to capture video of the desktop being displayed via the display device. Alternatively, a video camera may be positioned in proximity to a user electronic device. A data collection system 102 includes memory for storing input data or other information provided to the data collection system. The data collection system 102 may also include an internal clock for providing time and date stamps for the collected information.

In certain embodiments, a data collection system 102 may include one or more audio sensors. The audio sensors may capture audio of a surrounding area. For instance, a data collection system may include one or more microphones that are able to capture and/or record audio in the surrounding area.

A USL 104 is a library of screen images which contains information relevant to unique screens or applications used in an environment. For example, in a call center environment, a USL 104 may include a set of images of unique screens or applications that are available to or can be used by a call center agent. A USL 104 may include an indication of how many unique screen images exist and their layouts. A USL 104 may also include a visual representation of the screen images such as, for example, a thumbnail or other visual representation. In various embodiments, each unique screen may be associated with a screen identifier that uniquely identifies the screen. A USL 104 may store the screen identifier for one or more of the unique screens.

Figure 2:
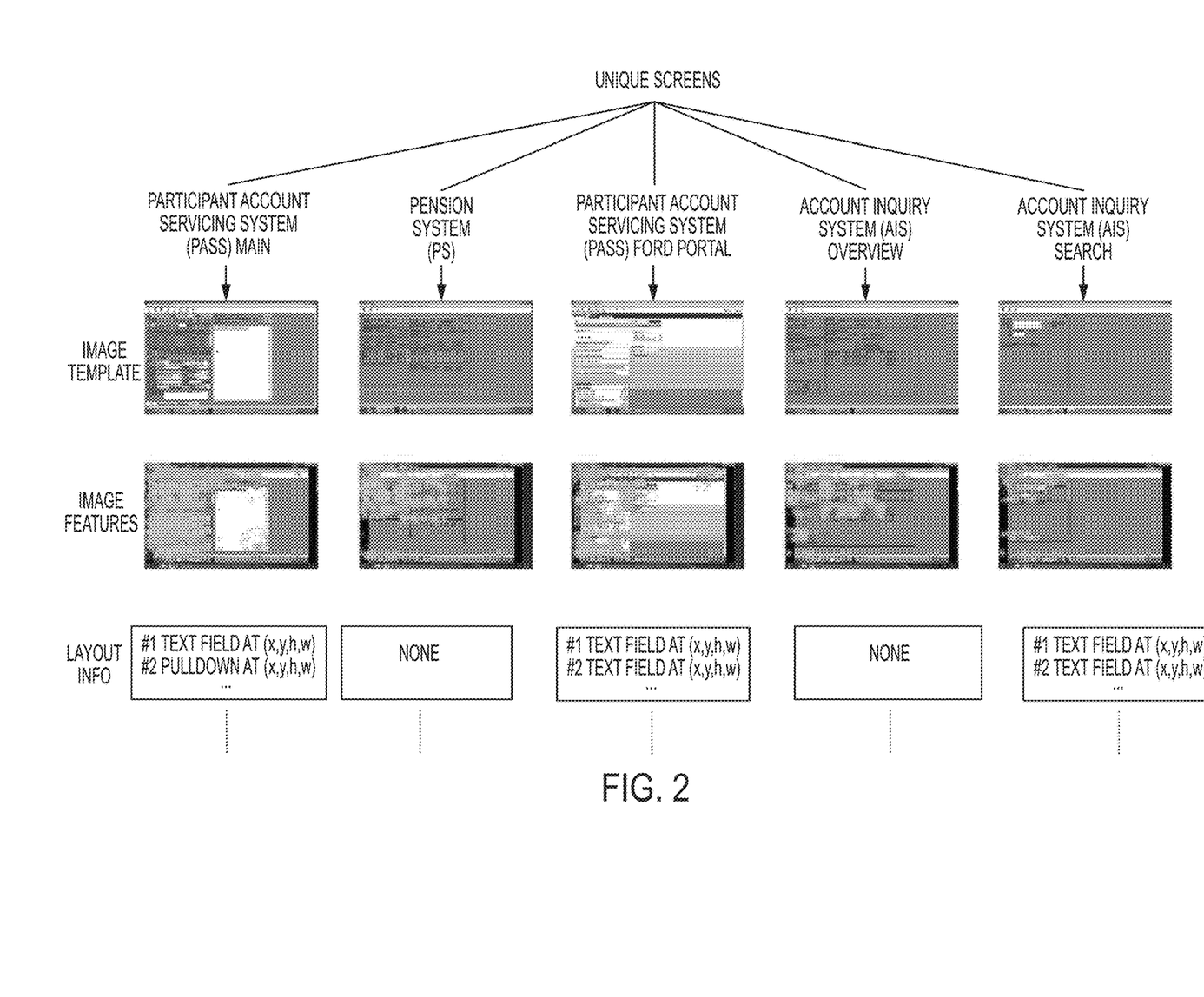
FIG. 2 shows an example of a USL for a call center according to an embodiment.
Figure 3:
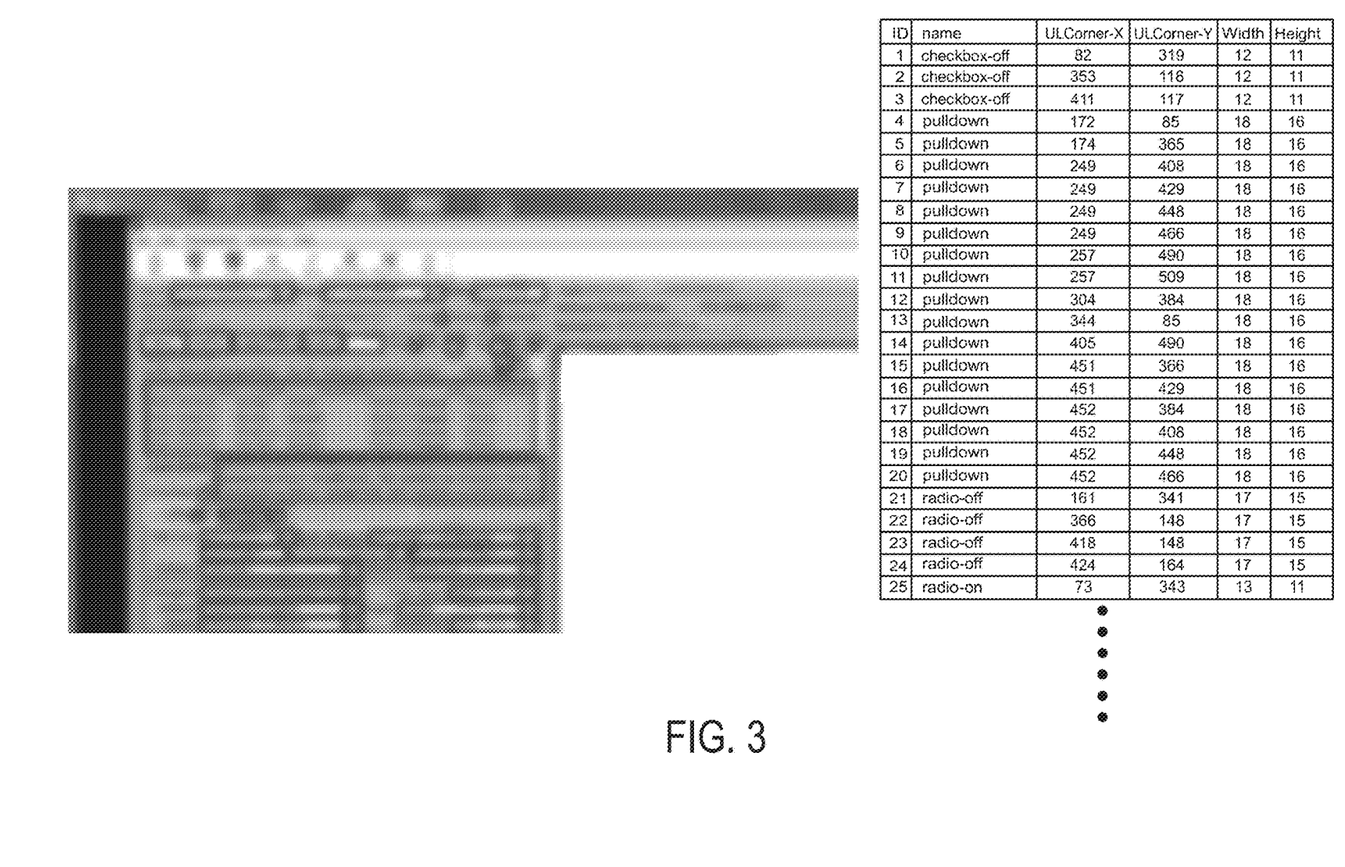
FIG. 3 shows an example of a labeled unique screen according to an embodiment.

FIG. 2 shows an example of a USL for a call center according to an embodiment. A USL may be implemented as a data structure in memory. For instance, a USL may be implemented as a database, a table, a list and/or the like. As illustrated by FIG. 2, the USL may have a hierarchical structure. The top layer contains the list of unique screens represented by their names. For each unique screen, various metadata can be collected and stored. For example, it may contain a sample image for template matching, a set of image features such as location and description of speeded up robust feature points, a set of layout information indicating types, positions, and sizes of known widgets (e.g., text field, pull-down menu, radio button, check box, etc.) in the given unique screen. Additional information about each unique screen can also be stored elsewhere for later retrieval. Once a screen is recognized, its layout information can be looked-up for action recognition. FIG. 3 shows an example of a labeled unique screen of the USL illustrated in FIG. 2, and an example of meta-data about the layout stored in the USL. A USL may include one or more rules followed by the unique screen. An example rule may be that a pull-down menu will appear whenever a mouse click happens within a box region.

The term unique screen is used to convey that the system considers functionally unique screens rather than detail or data unique screens. For instance, a call center may use an accounting service program that its call center agents can access from their electronic devices. The layout of the accounting service program is unique and the same regardless of with which client or customer the call center agent is working. However, when the call center agent is working with different clients, different and client-specific data is provided to the accounting service program which causes the exact appearance of the screens within the accounting service program to differ from client to client. A USL may include one library for the account service program rather than one library for each client for which the account service program is utilized. As such, the system described in this document differentiates between layout changes and data changes.

A screen change detection system 106 detects and recognizes when a user changes an active screen from the input data. An active window refers to a currently focused window of a user electronic device. A screen change detection system 106 analyzes a frame from the input data using the USL to identify the most likely unique screen identifier that corresponds to the frame.

An action recognition system 108 detects the occurrences of actions and recognizes the type of each detected action. An action recognition system 108 may include a window detection subsystem, a mouse detection subsystem, a widget identification subsystem, and/or an optical character recognition (OCR) subsystem as described in more detail below.

An event log generation system 110 generates logs that include the events and actions that are detected or recognized from the input data. An event log may be a visual representation of a timeline of events and/or actions.

Figure 4:
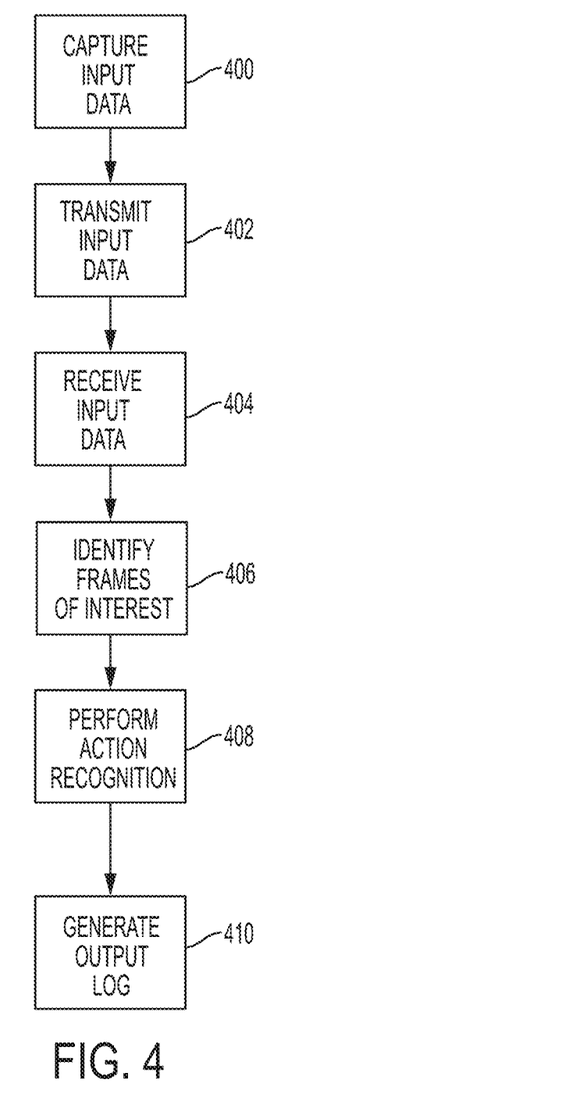
FIG. 4 illustrates an example method of performing process recognition according to an embodiment.

FIG. 4 illustrates an example method of performing process recognition according to an embodiment. As illustrated by FIG. 4, a screen recording system may capture 400 input data. Input data includes time-series video recording or video streaming of a user's desktop. For instance, input data may include time-series video recording or video streaming of a call center agent's desktop while the call center agent assists a client. In certain embodiments, input data may include audio data. For instance, in a call center environment, audio data may include a conversation that a call center agent is having with a customer.

The screen recording system transmits 402 the input data to an electronic device. The screen recording system may transmit 402 the input data as a video signal representing one or more frames from a time-series video recording or video stream. The frames may be images of a desktop that are displayed on a user electronic device during a session. A screen recording system may transmit 402 input data to an electronic device over a communication network. An electronic device may receive 404 input data from a screen recording system. For instance, a receiver of an electronic device may receive 404 the video signal.

In an embodiment, an electronic device may provide at least a portion of the received input data to a screen change detection system. A screen change detection system may reside on or at the electronic device. Alternatively, a screen change detection system may be located remotely from the electronic device, but may communicate with the electronic device such as, for example, via a communication network.

A screen change detection system receives input data from the electronic device. The screen change detection system identifies 406 one or more frames of interest from the input data. A frame of interest refers to a frame having a different layout than an immediately preceding frame in the time-series video recording or video stream. For instance, a screen change detection system may detect active window changes from the input data. Input data may include a time-series of images from a video recording of a call center agent desktop. The screen change detection system may analyze the images to detect screen changes on the desktop. For instance, a screen change detection system may analyze images to detect active window changes made by a call center agent during a session. As discussed above, the process of detecting screen changes focuses on changes in layout of a screen rather than changes in data included in the frame. In an embodiment, a screen change detection system may apply video processing techniques to identify a frame of interest.

Figure 5:
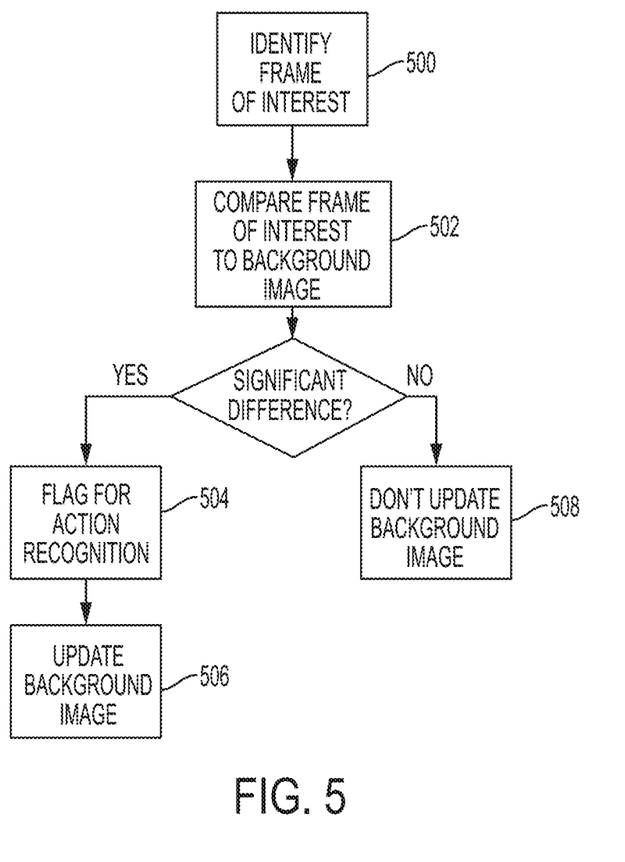
FIG. 5 illustrates an example method of identifying a frame of interest according to an embodiment.

FIG. 5 illustrates an example method of identifying 406 a frame of interest according to an embodiment. As illustrated by FIG. 5, a screen change detection system may identify 500 an image from the input data. The screen change detection system may compare 502 the identified image to a current background image to determine if there is a difference in the layouts between the identified image and the background image. The current background image may be an image that precedes the identified image in the time-series data. For instance, a current background image may be an image that immediately precedes the identified in time-series data. If there is a difference in layouts, the screen change detection system may flag 504 the image for action recognition and may update 506 the background image to reflect the image. Otherwise, the screen change detection system may not flag the image and may not update 508 the background image.

In certain embodiments, a screen change detection system may use background modeling and/or background subtraction to detect frames of interest. Background modeling refers to a technique for extracting objects in video frames. Background subtraction refers to an image processing technique that extracts an image's foreground for further processing.

The following illustrates an example approach to performing background modeling and background subtraction according to an embodiment.

$$B(1) = I(1)$$

$$B(t) = \begin{cases} B(t-1) & \text{if } |B(t-1) - I(t)| \leq \Delta \\ I(t) & \text{otherwise} \end{cases}$$

where I(t) represents a frame of input data at time t
B(t) represents a background frame at time t
Δ represents a threshold value that needs to be exceeded to switch the background to a new image, I(t).

For example, the approach described above may use a total count of pixels having background-foreground differences that are more than an amplitude of η (e.g., 10 of 8-bit range) as a measure of |B(t−1)−I(t)|. If the total count of said pixels above is greater than Δ, then the background is updated to current frame, I(t). If the total count of said pixels above is not greater than Δ, then the background image is kept the same as before, B(t).

Referring back to FIG. 4, the screen change detection system may identify 408 one or more actions that are performed within one or more of the identified frames of interest. For instance, a screen detection system may perform screen recognition on one or more frames of interest. A screen change detection system may perform screen recognition on a frame of interest to determine a screen identifier associated with the screen to which the frame of interest corresponds.

For instance, a screen change detection system may compare a frame of interest to one or more screens in a USL to determine the most likely screen identifier for the screen to which the frame of interest corresponds. The screen change detection system may compare one or more features, layout information, and other characteristics of the frame of interest and the screens in the USL to determine a screen from the USL to which the frame of interest most likely corresponds. The screen change detection system may retrieve the corresponding screen identifier for this screen from the USL.

As discussed above, the recognition process focuses on screen layout changes while discounting differences caused by client-specific data. A screen change detection system may use a matching method in the screen recognition process to generate a score for a frame of interest and a screen image from the USL. The score may indicate the likelihood that the frame of interest corresponds to the screen image from the USL.

The matching method may compare a frame of interest and a USL screen using two scales. A first scale may be at low resolution using correlation as a measure of similarity. For instance, a first scale may down sample an image by a factor of three. The first scale is used to coarsely match the layout of a USL screen image with that of a frame of interest. Applying the first scale to a frame of interest and a USL screen image yields a first score. The first score indicates how closely the frame of interest and the USL screen image correspond with respect to a high level layout.

A second scale may be a native resolution using a weighted percentage counts of matched points of interest, such as, for example a speeded up robust features (SURF) approach. The second scale matches finer details of screen layout between a USL screen image and a frame of interest. Applying the second scale to a frame of interest and a USL screen image yields a second score. The second score indicates how close the frame of interest and the USL screen image correspond with respect to finer layout details.

The screen change detection system may generate a final match score for the frame of interest and the USL screen image. The final match score may represent a likelihood that the frame of interest corresponds to the USL screen image. The final match score may be based on the first score and/or the second score. For instance, the final match score may be a weighted sum of the first score and the second score.

The screen change detection system may select the USL screen image corresponding to the highest final match score. The screen change detection system may identify the screen identifier associated with the selected USL screen image from the USL.

Figure 6:
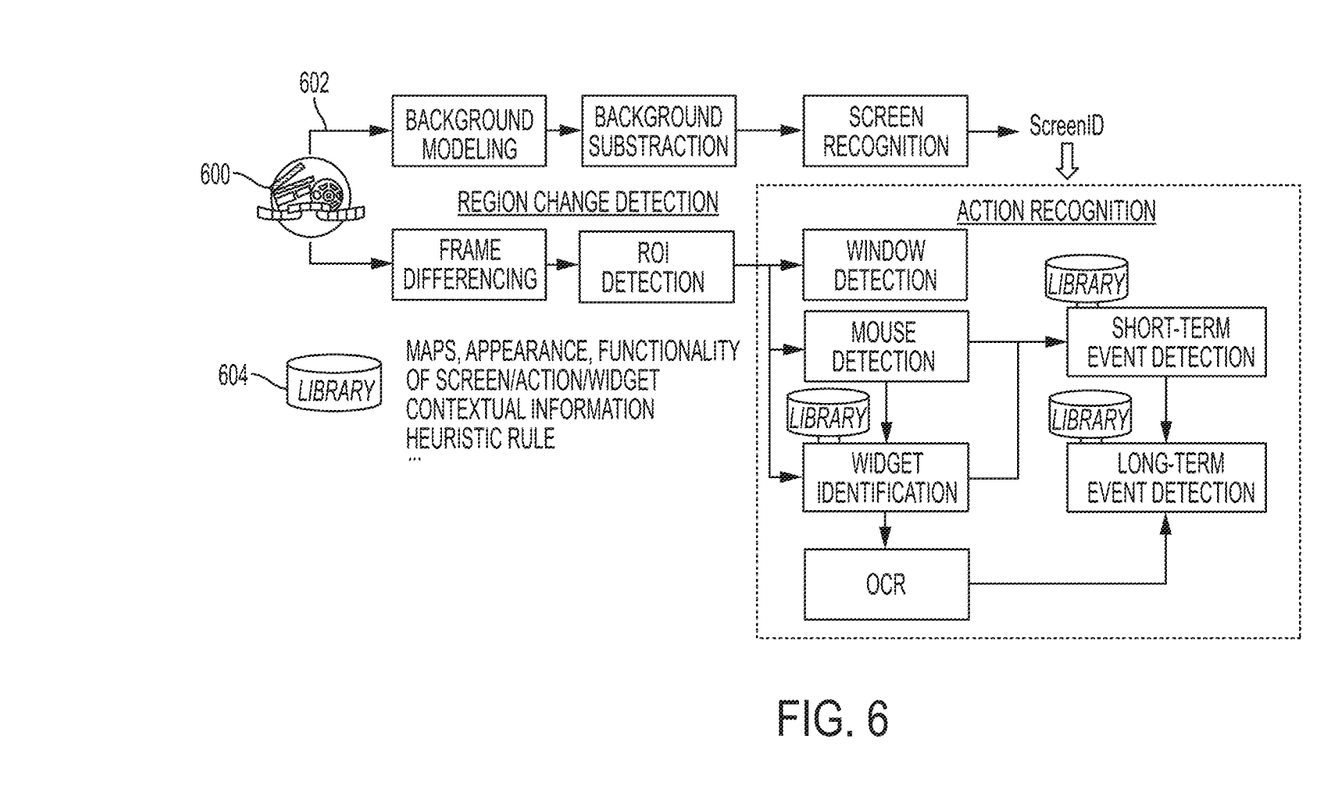
FIG. 6 illustrates an example screen change detection system and action recognition system according to an embodiment.

FIG. 6 illustrates an example screen change detection system and action recognition system according to an embodiment. As illustrated by FIG. 6, input data 600 is fed into the screen change detection system (top row) 602 and the action recognition system (bottom row) 604. The screen change detection system 602 utilizes background modeling and background subtraction to detect layout changes as discussed above. The system analyzes frames of interest using screen recognition to determine a screen identifier for the image. But instead of analyzing every frame for a screen identifier, the system analyzes a fraction of the frames (frames of interest) while assuming that the screen identifier is unchanged otherwise.

Referring back to FIG. 4, an action recognition system may perform action recognition 408 such as, for example, region change detection, on a frame of interest to determine one or more actions that was performed with respect to the frame of interest. An action refers to an interaction that a user, such as a call center agent, has with the frame of interest. Example actions may include, without limitation, a mouse click, a mouse double click, typing, selection of widget, the opening of a new window, switching windows and/or the like.

The action recognition system uses frame differencing to detect small and large changes that occur, which yields a change in pixel level. Pixels may be grouped into regions of interest using morphological filtering and/or connected component analysis. The action recognition system analyzes these regions of interest to determine one or more actions that were performed (action recognition).

Action recognition may involve determining whether a user has switched active windows. If the screen identifier associated with a frame of interest is different than a frame that immediately precedes the frame of interest or a frame that immediately follows a frame of interest, an action recognition system may determine that a performed action was a window change. An action recognition system may determine a screen identifier for a screen in the manner described above.

In various embodiments, action recognition may involve determining whether a region of interest is a desktop window. A desktop window may be a pop-up window, a new application window, and/or the like. An action recognition system may determine whether a region of interest is a desktop window by applying an image processing algorithm to determine whether the region of interest includes a feature or features indicative of a desktop window. For instance, an action recognition system may apply an image processing algorithm to determine whether it includes a minimize/resize/close icon in the upper left-hand corner of the region of interest, as this icon in this position is typically indicative of a desktop window.

An action recognition system may perform action recognition by detecting and tracking the position of a mouse cursor on one or more frames of interest. For example, an action recognition system may search a frame of interest or a region of interest within a frame of interest for an image of a mouse icon.

An action recognition system may perform action recognition by identifying widgets that are present in a frame of interest or region of interest. An action recognition system may identify widgets using image processing and/or machine learning techniques. For example, the USL may include coordinate and size information for all widgets present in a certain screen. An action recognition system may identify a widget by accessing a lookup table in the USL for the particular screen.

As another example, an action recognition system may detect a widget through image analysis. For instance, an action recognition system may detect a pulldown menu by searching a frame or region of interest for images of a pulldown icon. As another example, an action recognition system may detect a pulldown menu by determining whether a region of interest includes a list of vertically aligned text that occupies a majority of the region of interest.

As yet another example, an action recognition system may identify one or more widgets using a pre-training classifier which may distinguish one or more types of widgets (e.g., a radio button, a check button, etc.) from one or more other types of widgets through training of labeled examples.

Another example, in the case of a pulldown menu, an action recognition system may perform OCR on the region of interest across multiple images to determine which pulldown widget was selected or updated. In the case of a pop-up window, an action recognition system may analyze images to determine what options are included in the pop-up window and which option has been selected when coupled with mouse position detection. As another example, an action recognition system may perform image analysis on a region of interest to identify boxes shaded or not shaded, which may be indicative of a certain type of widget.

In certain embodiments, an action recognition system may translate a determined action to a set of categories, such as for example, an ontology. Table 1 illustrates an example ontology according to an embodiment.

TABLE 1

| Action | Widget |
| --- | --- |
| Select | Field |
| Click | Button |
| Change | RadioButton |
| DataEntry | PullDown |
|  | DialogBox |
|  | Screen |
|  | MultipleFields |
|  | Invalid |

An action recognition system may generate 410 an output log based on the performed action recognition. The output log may include visual representations of one or more actions that were detected by the action recognition system. The output log may also include one or more details about the actions. The actions may be presented on a screen-by-screen basis, and may be broken down by whether the action was a keyboard event (e.g., typing) or whether the action was a mouse event (e.g., left mouse single click, right mouse single click, left mouse double click, right mouse double click).

Figure 7:
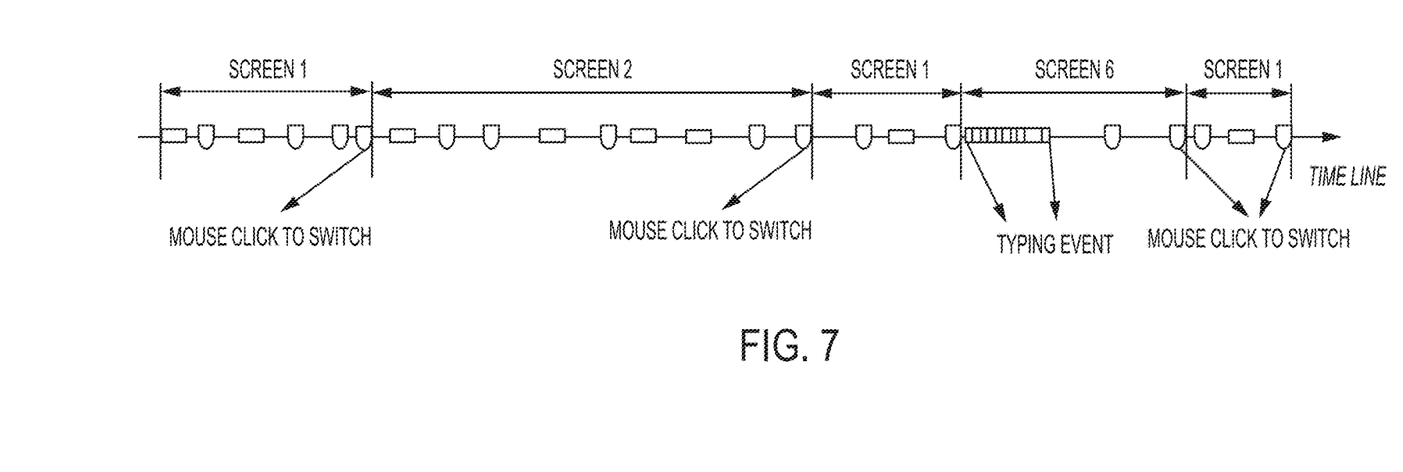
FIG. 7 illustrates an example output log according to an embodiment.

FIG. 7 illustrates an example output log according to an embodiment. As illustrated by FIG. 7, the output log shows a progression of screens captured in input data (e.g., Screen 1-->Screen 2-->Screen 1-->Screen 6-->Screen 1). The output log also shows visual representations of actions performed within each screen over a period of time.

In certain embodiments, an event log generation system may consolidate actions into a single action that is included in the log. For example, consecutive changes within a text-field may indicate a single typing event. Instead of having a long list of several short-duration typing events for the same text-field, the event log generation system may merge these typing events into a single typing event on the text-field with a cumulated duration indicating the total direction of the entire typing event.

An event log generation system may also compute a total time in between the typing events on the same text-field. As such, the system is able to recognize slow typing events, which may be due to situations where an agent is multi-tasking.

An event log generation system may extract useful details related to each event. For example, in the case of a typing event, the system may perform OCR on the region of the text field from both the image representing the start of the event and the image representing the end of the event. The system can thus determine what text was typed during this typing event. As another example, in the case of a pulldown event, the system may perform OCR on the region of the pulldown entry from the start and end images to determine which pulldown item was selected or updated in this pulldown event.

In various embodiment, a system may analyze audio input data along with video input data to identify one or more processes. For instance, in a call center environment, input data may include time-series video recording of a call center agent's desktop during a session as well as audio data representing a recording of a conversation between a call center agent and a customer during the session.

A system may analyze the audio data to identify one or more analytics. For instance, a system may determine a percentage of audio dead-time during the call, which may be represented by low amplitude audio signals over a period of time. Another example analytic may be a percentage of time a caller is speaking, a percentage of time an agent is speaking and/or the like.

A system may analyze one or more dead-time segments of the audio data along with image analytics extracted from the video input data to identify possible reasons for the dead-time (e.g., the agent is searching through desktop applications for answers). In certain embodiments, the system may recognize the content of the audio data (e.g., the words being spoken), and use this information to assist with the image analytics from the video input data. For example, if an agent or customer says the word "print", this may serve as a cue for the image analysis to look for a click of the print button on a desktop window.

Figure 8:
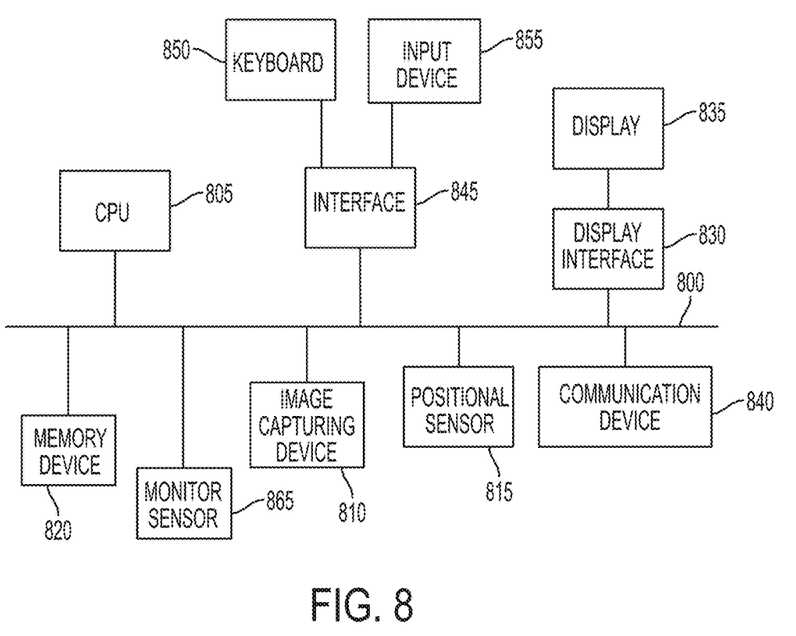
FIG. 8 illustrates a block diagram of example hardware that may be used to contain or implement program instructions according to an embodiment.

FIG. 8 depicts a block diagram of hardware that may be used to contain or implement program instructions, such as those of a cloud-based server, electronic device, virtual machine, or container. A bus 800 serves as an information highway interconnecting the other illustrated components of the hardware. The bus may be a physical connection between elements of the system, or a wired or wireless communication system via which various elements of the system share data. Processor 805 is a processing device that performs calculations and logic operations required to execute a program. Processor 805, alone or in conjunction with one or more of the other elements disclosed in FIG. 8, is an example of a processing device, computing device or processor as such terms are used within this disclosure. The processing device may be a physical processing device, a virtual device contained within another processing device, or a container included within a processing device.

A memory device 810 is a hardware element or segment of a hardware element on which programming instructions, data, or both may be stored. Read only memory (ROM) and random access memory (RAM) constitute examples of memory devices, along with cloud storage services.

An optional display interface 830 may permit information to be displayed on the display 835 in audio, visual, graphic or alphanumeric format. Communication with external devices, such as a printing device, may occur using various communication devices 840, such as a communication port or antenna. A communication device 840 may be communicatively connected to a communication network, such as the Internet or an intranet.

The hardware may also include a user input interface 845 which allows for receipt of data from input devices such as a keyboard or keypad 850, or other input device 855 such as a mouse, a touch pad, a touch screen, a remote control, a pointing device, a video input device and/or a microphone. Data also may be received from an image capturing device 820 such as a digital camera or video camera. A positional sensor 815 and/or motion sensor 865 may be included to detect position and movement of the device. Examples of motion sensors 865 include gyroscopes or accelerometers. An example of a positional sensor 815 is a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method for recognizing processes performed by a call center agent during a session, the method comprising:
    receiving, by a receiver of an electronic device, input data from a screen recording system, wherein the input data comprises a video signal representing a plurality of frames from a time-series video recording or video stream of a desktop of a user electronic device, wherein the user electronic device is associated with a call center agent in a call center environment, wherein each frame comprises an image of one or more screens displayed on the desktop during a session;
    processing the video signal to identify one or more frames of interest from the plurality of frames by:
        identifying a first frame from the plurality of frames as a background frame, wherein the background frame is associated with a unique identifier,
        identifying a second frame from the plurality of frames, wherein the second frame occurs after the background frame in the time-series video recording,
        determining whether a difference in layout exists between the background frame and the second frame by:
            comparing the second frame to one or more unique screen images from a unique screen library to determine a unique screen image from the unique screen library that corresponds to the second frame,
            identifying a screen identifier associated with the unique screen image that corresponds to the second frame, and
            determining that the difference in layout exists in response to the screen identifier associated with the unique screen image that corresponds to the second frame being different than the unique identifier associated with the background frame,
        in response to determining that the difference in layout exists between the background and the second frame, identifying the second frame as a frame of interest and updating the background frame to reflect the second frame,
    automatically identifying within one or more of the frames of interest one or more actions performed by the call center agent, wherein each action represents an interaction that the call center agent had with one or more screens corresponding to the frame of interest; and
    generating an event log that comprises a timeline depicting a visual representation of the identified actions.

2. The method of claim 1, wherein receiving input data from the screen recording system comprises receiving the input data from one or more video recording sensors that support video compression methods.

3. The method of claim 1, wherein comparing the second frame to one or more unique screen images comprises:
    for one or more of the unique screen images:
        applying a first scale to the second frame and the unique screen image to determine a first score, wherein the first score is indicative of how well a high level layout of the second frame corresponds to a high level layout of the unique screen image,
        applying a second scale to the second frame and the unique screen image to determine a second score, wherein the second score is indicative of how well a low level layout of the second frame corresponds to a low level layout of the unique screen image,
        determining a final match score for the unique screen image by summing the first score and the second score; and
    selecting the unique screen image having the highest corresponding final match score.

4. The method of claim 1, wherein automatically identifying within one or more of the frames of interest one or more actions performed by the call center agent comprises:
    performing frame differencing on the one or more frames of interest to detect one or more regions of interest, wherein each region of interest represents a change in pixel level;
    determining whether the region of interest comprises a desktop window; and
    in response to determining that the region of interest comprises a desktop window, identifying a window opening as a performed action.

5. The method of claim 1, wherein automatically identifying within one or more of the frames of interest one or more actions performed by the call center agent comprises:
    performing frame differencing on the one or more frames of interest to detect one or more regions of interest, wherein each region of interest represents a change in pixel level;
    determining whether the region of interest comprises a movement in a position of a mouse cursor; and
    in response to determining that the region of interest comprises a movement in a position of a mouse cursor, identifying a mouse event as a performed action.

6. The method of claim 1, wherein generating an event log that comprises a timeline depicting a visual representation of the identified actions comprises:

identifying whether the identified actions comprise a plurality of short-duration typing events at a same text-field;
in response to identifying that the identified actions comprise a plurality of short-duration typing events at a same text-field, combining the short-duration typing events into a single typing event; and
adding the single typing event to the event log.

7. The method of claim 1, wherein the input data further comprises audio data corresponding to a conversation between the call center agent and a caller during the session, the method further comprising:
analyzing the audio data for one or more periods of dead time during which neither the call center agent nor the caller is speaking; and
for one or more of the periods of dead time, analyzing the identified actions that occurred during the periods of dead time to determine one or more possible reasons for the periods of dead time.

8. A system for recognizing processes performed by a call center agent during a session, the system comprising:
an electronic device; and
a computer-readable storage medium comprising one or more programming instructions that, when executed, cause the electronic device to:
receive input data from a screen recording system, wherein the input data comprises a video signal representing a plurality of frames from a time-series video recording or video stream of a desktop of a user electronic device, wherein the user electronic device is associated with a call center agent in a call center environment, wherein each frame comprises an image of one or more screens displayed on the desktop during a session,
process the video signal to identify one or more frames of interest from the plurality of frames by:
identifying a first frame from the plurality of frames as a background frame, wherein the background frame is associated with a unique identifier,
identifying a second frame from the plurality of frames, wherein the second frame occurs after the background frame in the time-series video recording,
determining whether a difference in layout exists between the background frame and the second frame by:
comparing the second frame to one or more unique screen images from a unique screen library to determine a unique screen image from the unique screen library that corresponds to the second frame,
identifying a screen identifier associated with the unique screen image that corresponds to the second frame, and
determining that the difference in layout exists in response to the screen identifier associated with the unique screen image that corresponds to the second frame being different than the unique identifier associated with the background frame,
in response to determining that the difference in layout exists between the background and the second frame, identifying the second frame as a frame of interest and updating the background frame to reflect the second frame,
automatically identify within one or more of the frames of interest one or more actions performed by the call center agent, wherein each action represents an interaction that the call center agent had with one or more screens corresponding to the frame of interest, and
generate an event log that comprises a timeline depicting a visual representation of the identified actions.

9. The system of claim 8, wherein the one or more programming instructions that, when executed, cause the electronic device to receive input data from the screen recording system comprise one or more programming instructions that, when executed, cause the electronic device to receive the input data from one or more video recording sensors that support video compression methods.

10. The system of claim 8, wherein the one or more programming instructions that, when executed, cause the electronic device to compare the second frame to one or more unique screen images comprise one or more programming instructions that, when executed, cause the electronic device to:
for one or more of the unique screen images:
apply a first scale to the second frame and the unique screen image to determine a first score, wherein the first score is indicative of how well a high level layout of the second frame corresponds to a high level layout of the unique screen image,
apply a second scale to the second frame and the unique screen image to determine a second score, wherein the second score is indicative of how well a low level layout of the second frame of interest corresponds to a low level layout of the unique screen image, and
determine a final match score for the unique screen image by summing the first score and the second score; and
select the unique screen image having the highest corresponding final match score.

11. The system of claim 8, wherein the one or more programming instructions that, when executed, cause the electronic device to automatically identify within one or more of the frames of interest one or more actions performed by the call center agent comprise one or more programming instructions that, when executed, cause the electronic device to:
perform frame differencing on the one or more frames of interest to detect one or more regions of interest, wherein each region of interest represents a change in pixel level;
determine whether the region of interest comprises a desktop window; and
in response to determining that the region of interest comprises a desktop window, identify a window opening as a performed action.

12. The system of claim 8, wherein the one or more programming instructions that, when executed, cause the electronic device to automatically identify within one or more of the frames of interest one or more actions performed by the call center agent comprise one or more programming instructions that, when executed, cause the electronic device to:
perform frame differencing on the one or more frames of interest to detect one or more regions of interest, wherein each region of interest represents a change in pixel level;
determine whether the region of interest comprises a movement in a position of a mouse cursor; and
in response to determining that the region of interest comprises a movement in a position of a mouse cursor, identify a mouse event as a performed action.

13. The system of claim 8, wherein the one or more programming instructions that, when executed, cause the electronic device to generate an event log that comprises a timeline depicting a visual representation of the identified actions comprise one or more programming instructions that, when executed, cause the electronic device to:
- identify whether the identified actions comprise a plurality of short-duration typing events at a same text-field;
- in response to identifying that the identified actions comprise a plurality of short-duration typing events at a same text-field, combine the short-duration typing events into a single typing event; and
- add the single typing event to the event log.

14. The system of claim 8, wherein:
- the input data further comprises audio data corresponding to a conversation between the call center agent and a caller during the session,
- the computer-readable storage medium further comprises one or more programming instructions that, when executed, cause the electronic device to:
  - analyze the audio data for one or more periods of dead time during which neither the call center agent nor the caller is speaking; and
  - for one or more of the periods of dead time, analyze the identified actions that occurred during the periods of dead time to determine one or more possible reasons for the periods of dead time.

* * * * *